May 13, 1930.  A. H. CANDEE  1,758,102
APPARATUS FOR RELIEVING HOBS
Filed June 30, 1927   2 Sheets-Sheet 2
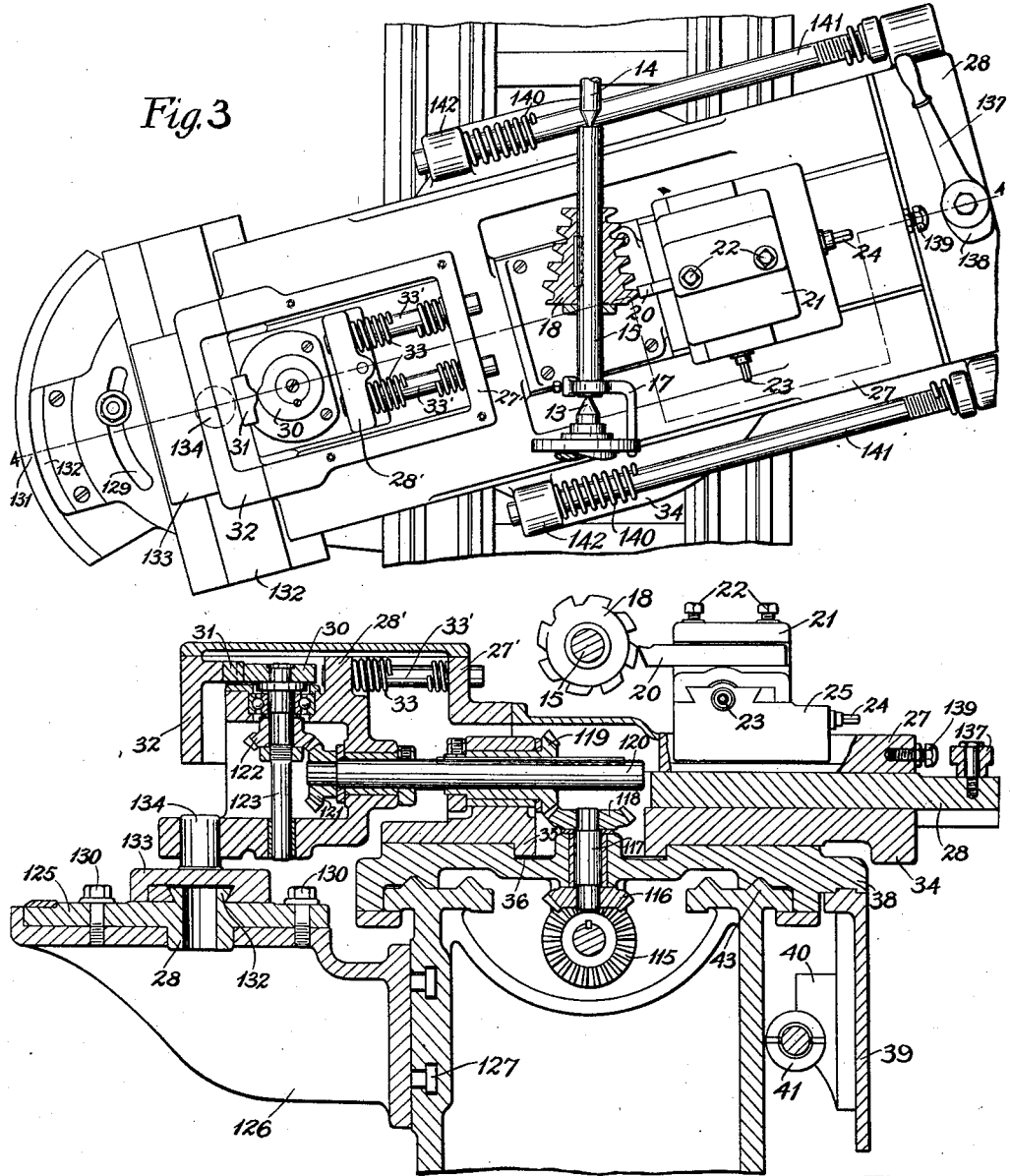
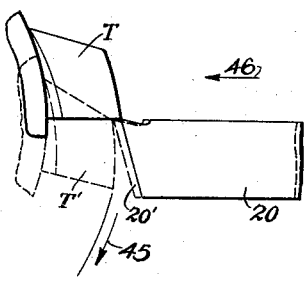
INVENTOR.
Allan H. Candee
BY
ATTORNEY Patented May 13, 1930

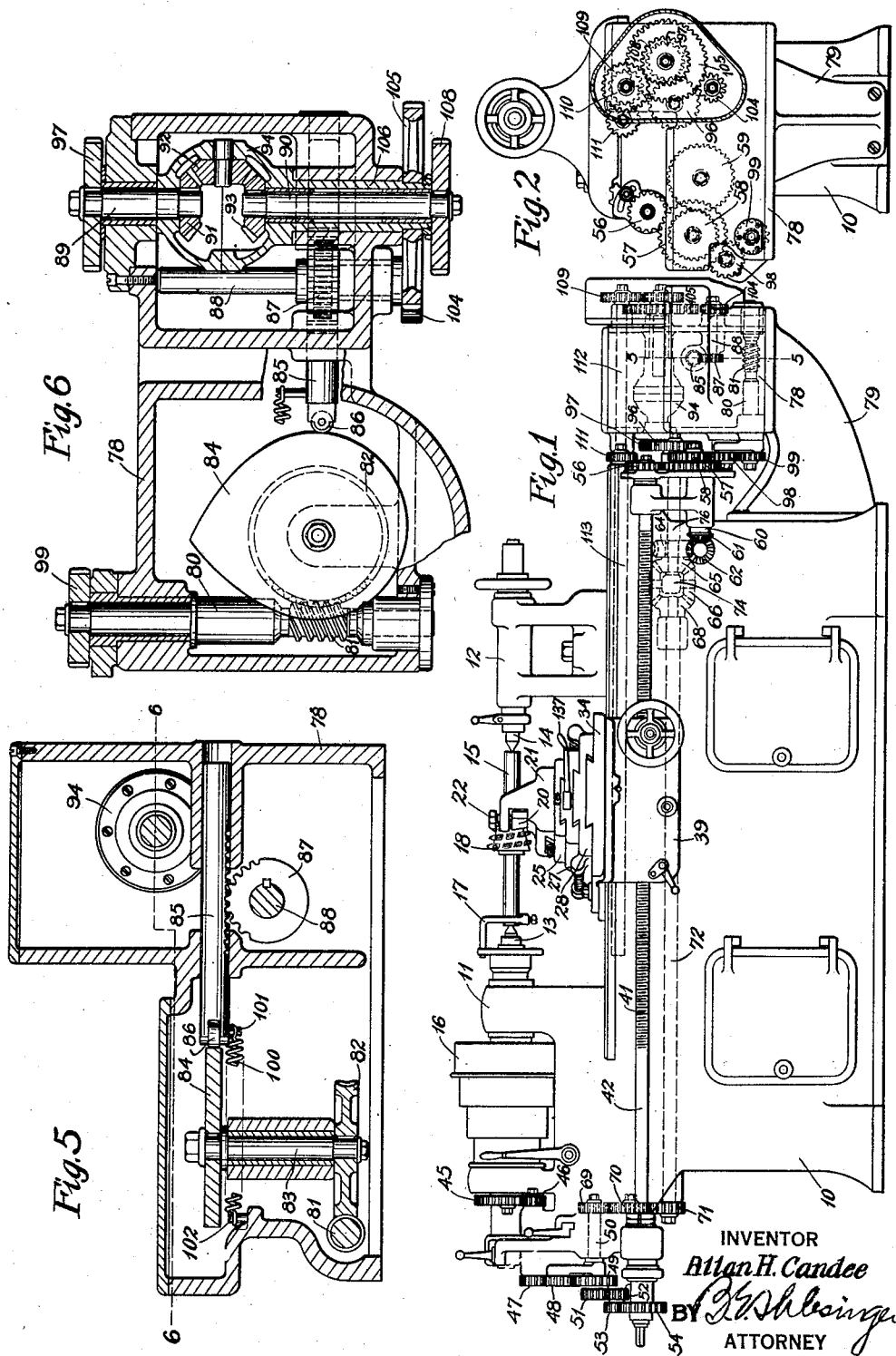

1,758,102

UNITED STATES PATENT OFFICE

ALLAN H. CANDEE, OF ROCHESTER, NEW YORK, ASSIGNOR TO GLEASON WORKS, OF ROCHESTER, NEW YORK, A CORPORATION OF NEW YORK

APPARATUS FOR RELIEVING HOBS

Application filed June 30, 1927. Serial No. 202,696.

The present invention relates to apparatus for relieving hobs.

The primary purpose of this invention is to provide means for relieving hobs which are gashed along spirals of varying lead. A further purpose of this invention is to provide mechanism which may serve as an attachment for a lathe of any conventional type to adapt such a lathe for relieving a hob having spiral flutes or gashes of varying lead. A still further object of this invention is to provide apparatus and particularly an attachment for lathes which will enable the tooth of a multiple thread taper hob having spiral flutes or gashes of varying lead to be properly and correctly relieved.

Still further objects of the invention will be apparent hereinafter from the specification and from the recital of the appended claims.

In the drawings:

Figure 1 is a side elevation and Figure 2 an end view of a lathe of a conventional type equipped with apparatus, constructed according to the present invention, for adapting the lathe for use in relieving a taper hob having spiral flutes or gashes of varying lead;

Figure 3 is a partial plan view of the mechanism shown in Figure 1;

Figure 4 is a section on the line 4—4 of Figure 3;

Figure 5 is a section on the line 5—5 of Figure 1;

Figure 6 is a section on the line 6—6 of Figure 5; and

Figure 7 is a diagrammatic view illustrating the relieving operation.

To secure equal and good cutting action on both sides of the teeth of a hob, the hob flutes or gashes should intersect the hob threads at the same angle at all points and preferably should be perpendicular to the hob thread. For a single thread hob, a straight flute or gash, that is, a flute or gash which extends axially of the hob is satisfactory. For a multiple thread hob, however, spiral flutes or gashes should be employed in order to have the flutes or gashes intersect the thread at right angles. In the case of multiple thread taper hobs this requires the gashes or flutes to be of varying lead.

In relieving the teeth of a hob a relieving motion is imparted continuously to the tool, a slow relative movement is imparted between the tool and hob blank longitudinally of the hob and simultaneously and in timed relation with this last named movement the hob blank is rotated continuously on its axis. The relieving motion causes the tool to engage successively each tooth of the hob and, during engagement with that tooth, to move gradually toward the hob to relieve the tooth back of its cutting edges. After any particular tooth has passed by the tool, the tool is quickly withdrawn away from the hob ready for operation on the next tooth as that tooth rotates and is fed into engagement with it. Where a hob is gashed along spiral flutes of varying lead, the cutting edges are located at varying positions axially and circumferentially of the hob and the relieving operation must take place, therefore, at varying intervals in order to properly and correctly relieve all the teeth. The purpose of the present invention is to provide apparatus for accomplishing the relieving of a hob whereby the relieving operation on successive teeth of the hob may be effected in conformity with the relative axial and circumferential location of the teeth, that is, in conformity with the variation in lead of the flutes or gashes of the hob along the length of the hob.

In the drawings, 10 indicates the base or frame of a lathe of a conventional type. Mounted upon the frame or base 10 are the head and tail stocks 11 and 12, respectively, which serve as supports for the centers 13 and 14. The spindle or arbor 15 upon which the hob to be relieved is secured, is mounted between the centers and is adapted to be rotated continuously from the pulleys 16 through the live spindle of the head stock and the driving dog 17. In the drawings, the machine is shown arranged for operating upon a taper hob 18 which is multiple threaded and of constant pitch in axial section.

The relieving tool 20 is secured in the tool block 21 by means of the set-screws 22 and this tool block 21 may be adjusted in two directions at right angles to each other by applying a wrench or other suitable tool to the threaded shafts 23 and 24, one of which engages a nut on the tool block and the other a nut on the tool block carrier 25. The tool block carrier 25 is mounted upon a slide 27 which is reciprocable on the carrier 28 for imparting the relieving motion to the tool 20. The relieving operation is effected through a cam 30 which is driven continuously by mechanism to be hereinafter described and which engages a contact member or follower 31 which is secured to an extension 32 of the slide 27.

The carrier 28, the purpose of which will be hereinafter described, moves on a dovetailed guide formed on a rotatably adjustable plate 34 which is provided with an annular flange 35 that seats in an annular recess 36 formed in the upper face of the slidable bed or carriage 38 of the lathe. The bed or carriage 38 is provided with an apron 39 which carries a nut 40 that engages a lead screw 41 formed on the shaft 42. Rotation of the lead screw 41, therefore, imparts movement to the bed or carriage 38 and to the relieving tool 20 carried thereby in a direction longitudinally of the work 18, the carriage 38 traveling on ways 43 formed on the upper face of the frame or base 10. It will thus be seen, that as the hob 18 rotates on its axis, relieving motions are imparted to the tool 20 under actuation of the cam 30 and simultaneously the tool is moved longitudinally of the hob by means of the lead screw 41 and the bed 38.

The relieving operation is illustrated diagrammatically in Figure 7. T indicates a tooth of the hob. The hob is rotated in the direction of the arrow 45 and the relieving tool 20 is moving under actuation of the cam 30 in the direction of the arrow 46. It is to be understood, also, that the tool is moving slowly in a direction longitudinally of the hob because of the movement of the carriage on which the tool is mounted. The heavy lines indicate the positions of the tooth T and the tool 20 when the tool engages the tooth. As the tooth rotates past the tool, the tool is drawn in toward the hob by the cam 30, thus relieving the hob tooth. The dotted line positions T' and 20' show the positions assumed by tool and hob when the tooth has moved completely under the tool. The cam 30 is of the snail shell type and permits the springs 33 to move the tool suddenly away from the hob when the high point of the cam turns past the follower, which occurs just as a gash or flute of the hob is opposite the tool. Thus after relieving one tooth the tool is moved back into position ready to relieve the next tooth of the hob. The coil springs 33 are mounted on rods 33' which are secured in a flange 28' of the carrier 28 and slide in apertures formed in the flange 27' of the slide 27. As is obvious, the relieving movement of the tool under actuation of the cam must be timed relative to the rotary movement of the work and the longitudinal movement of the carriage 38 to take care of the axial and circumferential displacement of successive teeth of the hob. In order to relieve correctly, therefore, a hob having flutes of varying lead, the relieving motion must take place at a variable velocity. In the machine illustrated the cam 30 can be rotated continuously at a variable velocity determined by the variation in the lead or spiral of the flutes of the hob.

The lead screw 41 is driven from the pulley shaft by means of the gears 45, 46, 47, 48, 49, the shaft 50, the gear 51 mounted thereon, the gears 52 and 53, and the gear 54 which is secured to the lead screw shaft 42. The lead screw shaft 42 carries at its further end a spur gear 56 forming one of a set of change gears and driving, through the other change gears of the set 57, 58, and 59, the shaft 60. This shaft 60 carries at its inner end a bevel gear 61 which meshes with a bevel gear 62 upon a cross-shaft upon which is mounted a worm meshing with the worm wheel 64 which is keyed to the side gear 65 of the differential 66. The other side gear 68 of the differential is rotated in timed relation with the rotation of the work spindle or arbor 15 from the shaft 50 through the change gears 69, 70, 71, and the shaft 72. Thus the spider 74 on the differential 66 and the gears carried by the spider are rotated in timed relation with the arbor rotation and the carriage movement. The spider 74 is connected to the shaft 76 which is coaxial with the side gear 65 and the worm wheel 64 and which forms a bearing for these two gears. The mechanism just described is of the conventional type and commonly found in relieving lathes.

The mechanism for producing a continuous rotation of the cam at a variable velocity and forming one embodiment of a lathe attachment constructed according to this invention is assembled in a housing 78 carried by a bracket 79 which is secured to the frame or base 10 of the machine. This mechanism includes the worm shaft 80, the worm 81 mounted thereon, the worm wheel 82 which meshes with the worm and is driven thereby, the shaft 83, the cam 84, the rack member 85, the roller or follower 86 carried thereby, the pinion 87 meshing with the rack, the pinion shaft 88, the shafts 89 and 90, the differential gears 91, 92, and 93 connecting the shaft and the housing 94 for the differential.

The shaft 89 is connected with the shaft 76, which as previously described is rotated in timed relation with the blank spindle rotation and the table movement, through the gears and 97. Thus the differential side gear 91 is driven continuously at a uniform velocity in timed relation with the blank spindle rotation and table movement. The worm shaft 80 is driven from the lead screw shaft 42 by the gears 56, 57 and 58 already referred to, and the gears 98 and 99. The worm 81 drives the worm wheel 82 and the shaft 83 upon which the wheel is mounted, thus rotating continuously the cam 84 which is secured to said shaft. This cam 84 is designed with reference to the form of the gashes of the hob. As the cam 84 rotates it imports a reciprocatory movement at a variable velocity to the rack member 85 thus rotating at a variable velocity the pinion 87 which meshes with that rack member. The roller 86 carried by the rack member is held in contact with the cam 84 at all times by the coil spring 100, one end of which is connected to a pin 101 carried by the rack member 85 and the other end of which is connected to a pin 102 which is secured to the housing 78. The pinion 87 is mounted on the shaft 88 which carries at its outer end a pinion 104 that meshes with a gear 105 which is secured to the sleeve 106 of the differential housing 94. The side gear 93 and the shaft 90, upon which this gear is mounted, thus receive a rotational movement which is at a variable velocity as required by the variation in lead or spiral of the flutes of the hob to be relieved and which is in timed relation with the work spindle rotation and the movement of the carriage 38.

The shaft 90 upon which the side gear 93 is keyed is journaled in suitable bearings in the sleeve 106 of the differential housing 94 and carries at its outer end a spur gear 108. This spur gear 108 forms one of a set of change gears selected according to the number of gashes or flutes of the hob and drives through the other change gears 109, 110, and 111 of the set and the shaft 112 carrying the gears 109 and 110, the shaft 113.

This shaft 113 is journaled in suitable bearings in the base or frame of the machine and has a splined connection with a bevel gear 115 (Fig. 4) which meshes with and drives a bevel gear 116 on a stub shaft 117 which carries at its upper end the bevel gear 118. This bevel gear 118 meshes with and drives a bevel gear 119 which has a splined connection with the shaft 120. The bevel gear 119 is journaled in the angularly adjustable plate 34. The shaft 120 carries adjacent its outer end a bevel gear 121 and is journaled in a suitable bearing in the carrier 28. The bevel gear 121 meshes with a bevel gear 122 which is secured to a vertical shaft 123 which is journaled in suitable bearings in the carrier 28 and which carries at its upper end the relieving cam 30.

Through the mechanism described, the cam 30 is rotated continuously at a variable velocity as required by the lead of the spiral flutes of the hob to impart the required relieving movement to the tool 20.

The present invention may be employed in relieving multiple thread hobs having flutes or gashes of varying lead, whether the hob be cylindrical or tapered. In the drawings, the invention is illustrated in connection with the relieving of a tapered hob. For relieving such a hob upon a lathe, it is preferred to employ a taper attachment such as described in the copending application of Ernest C. Head, Serial No. 202,695, filed June 30, 1927. It is to be understood, however, that this invention is not restricted, in the relieving of tapered hobs, to use with that mechanism.

The taper attachment includes an adjustable guide member 125 which is angularly adjustable upon the bracket 126 which is secured by means of T-bolts 127 to the side of the frame or bast 10 of the machine. The guide member 125 is provided with an annular flange 128 which seats in a socket formed in the bracket 126. The guide member 125 is formed with circular slots 129, concentric with the flange 128 and may be secured in any adjusted position by means of the bolts 130. A scale 131 and an index mark 132 serve to assist in determining the angular adjustment of the plate 125. The guide member 125 is provided with a dovetailed guide or way 132 upon which the follower 133 is adapted to slide. This follower is pivotally connected with the carrier 34 by means of a pin 134.

In using the taper attachment, the plate 34 is angularly adjusted so that the slide 27 upon which the relieving tool is carried, will move at right angles to the cone surface of the hob and the guide plate 125 is adjusted so that the guide way 132 will be parallel to the cone surface of the hob and the follower 133 move parallel to said cone surface. The angular adjustments of the guide plate 34 and the guide plate 125 will depend, of course, upon the cone angle of the hob to be relieved.

As the bed or carriage 38 moves under actuation of the lead screw 41 the carrier 34 will be moved toward the hob under actuation of the guide 132 and the follower 133 so that the relieving tool will be maintained at all times in operative relation with the teeth of the hob as it moves from one end to the other of the hob.

The operation of the mechanism illustrated will be apparent from the description already given but may be briefly summed up as follows. The work and tool are first adjusted into proper relation and guide plates 34 and 125 set to the proper angles as determined by the cone angle of the hob. For a cylindrical hob, of course, a taper attachment will not be required. The change gears 51, 52, 53 and 54, are selected in accordance with the lead of the thread and the cone angle of the hob;

the change gears 56, 57, 58 and 59, are selected in accordance with the lead of the spiral of the gashes at some particular point; the change gears 108, 109, 110 and 111 in accordance with the number of gashes on the hob; and the change gears 98 and 99 are selected in accordance with the length of the hob. The cam 84 is selected in accordance with the variation in lead or spiral angle of the hob flutes or gashes. Then the machine is started. The work is rotated continuously at a uniform velocity from the pulley 16 through the live center and the driver 17. Simultaneously, the lead screw 42 is rotated through the gears 45, 46, 47, 48, 49, 51, 52, 53, and 54 to move the tool 20 longitudinally of the hob in accordance with the lead of the hob thread and in timed relation with the hob rotation. The longitudinal movement of the table 38 under actuation of the lead screw 41 causes a gradual relieving movement of the tool 20 toward the hob axis as the tool moves longitudinally of the hob, under actuation of the taper attachment which includes the guide 132 and the follower 133 and which causes a gradual feed movement of the carrier 34 toward the hob as the bed or carriage 38 moves longitudinally. Simultaneously with these movements, the tool 20 and its slide 27 are reciprocated a plurality of times depending upon the number of teeth in the hob, the tool being reciprocated once for each tooth. The relieving or reciprocating movement is effected by the cam 30 which rotates at a variable velocity in timed relation with the hob rotation and bed movement. This cam 30 is driven by the gears 122, 121, 119, 118, 116, 115, the shaft 113, the gears 111, 110, 109, 108, from the differential gears, 91, 92 and 93. The gears of the differential combine the uniform velocity rotation of the shaft 89 with the variable rotation of the differential housing 94. The shaft 89 is driven from the differential 66 which is a conventional part of the lathe and which imparts a rotary movement in timed relation with the blank rotation and the lead screw rotation to this shaft 89. The differential housing 94 is rotated at a variable velocity by means of the cam 84, the rack 85, the pinion 87, the pinion 104 and the gear 105. The cam 84 is driven from the lead screw by the gears 56, 57, 58, 98, 99, the worm 81 and the worm wheel 82. It will thus be seen, that as the hob rotates and the bed or carriage 38 travels on the base 10 a relieving movement will be imparted to the tool to move the tool gradually toward the hob and suddenly away from it, once for each tooth of the hob, and that simultaneously the carrier 34 and the tool and its slide will be moved toward the hob, as the hob tapers from one end to the other to maintain the tool in operative relation with the hob.

After the tool has made one traverse lengthwise of the hob under actuation of the lead screw 41, the lead screw may be reversed and the tool returned to original position where it may be readjusted to take another cut upon the hob or to perform another relieving operation. In Figure 7, the tool is shown in position for relieving the tips of the teeth of the hob, but the operation of the machine is the same when the tool is positioned for relieving either side face of the teeth of the hob. The lead screw can be reversed by any suitable mechanism such as is commonly employed in machines of the character described. Ordinarily it will be reversed at a faster speed than its rotation during cutting to eliminate as far as possible idle time. To avoid unnecessary jar and shock on the return movement of the bed, the cam 30 may be disengaged from the slide 27 and the contact member 31 by throwing the lever 137 around to the right from the position shown in Figure 3 so as to bring the cam surface 138 of this lever into contact with the set screw 139 which is secured to the slide 27. The coil springs 140 mounted on the rods 141 which are secured to the carriage 38 and which are guided in sleeves 142 that are secured to the angularly adjustable plate 34 serve to cushion the movement of the carrier 28 under actuation of the taper attachment and to assist in returning the carrier 28 to original position on the reverse stroke of the bed or carriage 38.

The apparatus of the present invention may be employed in relief grinding hobs and the term "cutting" as used in the claims is intended to cover this operation also.

While a particular embodiment of the invention has been described in connection with a particular use for that embodiment, it will be understood that the invention is capable of various further modifications and uses without departing from its scope and that this application is intended to cover any adaptations, uses, or embodiments, following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. In apparatus for relieving hobs, a rotatable blank support, a tool support, a tool mounted thereon, a bed movable in a direction longitudinally of the blank and adapted to carry one of said supports, means for moving said bed, means for simultaneously imparting a continuous rotary movement to the blank support, and means for simultaneously and in timed relation with the bed and blank movements reciprocating said tool support to effect a relieving movement of the tool, and means for actuating one of said prior mentioned means at a varying velocity and the others at uniform velocities.

2. In apparatus for relieving hobs, a rotatable blank support, a tool support, a tool mounted thereon, a bed movable in a direction longitudinally of the blank and adapted to carry one of said supports, means for moving the bed continuously at a uniform velocity, means for simultaneously rotating the blank support on its axis at a uniform velocity, and means for simultaneously and in timed relation with the bed and blank movements imparting a relieving movement to the tool support at a varying velocity.

3. In apparatus for relieving hobs, a rotatable blank support, a tool support, a tool mounted thereon, a bed movable in a direction longitudinally of the blank and adapted to carry one of said supports, means for moving the bed continuously at a uniform velocity, means for simultaneously rotating the blank support continuously on its axis at a uniform velocity, a cam for reciprocating the tool support to impart a relieving movement thereto, and means for continuously rotating the cam at a varying velocity in timed relation with the bed and blank movements.

4. In apparatus for relieving hobs, a rotatable blank support, a reciprocable tool support, a tool mounted thereon, a bed movable in a direction longitudinally of the blank and adapted to carry one of said supports, means for imparting a continuous movement at a uniform velocity to the bed, means for rotating the blank support on its axis continuously at a uniform velocity, means for reciprocating the tool support and mechanism for actuating the last named means continuously at a variable velocity, including a differential, gearing for imparting a movement at a uniform velocity to the differential in timed relation to the bed and blank movements and means for imparting simultaneously a movement at a varying velocity to said differential.

5. In apparatus for relieving hobs, a rotatable blank support, a reciprocable tool support, a tool mounted thereon, a bed movable in a direction longitudinally of the blank and adapted to carry one of said supports, means for imparting a continuous movement to the bed at a uniform velocity, means for rotating the blank support on its axis continuously at a uniform velocity, a cam for reciprocating the tool support and means for continuously rotating said cam including a differential, one element of which is driven continuously at a uniform velocity in timed relation with the blank and bed movements, a second cam, means for rotating the second cam, and means operatively connecting said second cam to another element of the differential to impart a movement at a varying velocity thereto.

6. In apparatus for relieving taper hobs, a rotatable blank support, a reciprocable tool support, a bed movable in a direction longitudinally of the blank and adapted to carry one of said supports, means for moving the bed continuously, means for rotating the blank support on its axis continuously, means for reciprocating the tool support in timed relation with the blank and bed movements, one of said means being actuated at a varying velocity, and means for simultaneously imparting a relative feed movement between the tool and blank support in a direction perpendicular to the cone surface of the blank as the bed moves longitudinally.

7. In apparatus for relieving taper hobs, a frame, a bed slidable longitudinally on the frame, a rotatable blank support, journaled in the frame, a reciprocable tool support, a carrier on which the tool support is mounted, a plate on which the carrier is slidable, mounted on the bed, means for moving the bed, means for rotating the blank support on its axis, means for simultaneously reciprocating the tool support in timed relation with the bed and blank movement, one of said means being actuated at a varying velocity, a guide-rail carried by the frame and adjustable into a position parallel to the cone surface of the blank and means carried by said carrier and adapted to engage said guide-rail whereby as the bed moves longitudinally the carrier is fed relative to the blank in a direction perpendicular to its cone surface.

8. A relieving attachment for a lathe provided with a rotatable blank support, a reciprocable tool support, a slidable bed on which one of said supports is mounted, a lead screw for moving the tool support, means for rotating the blank support, a cam for reciprocating the tool support, a cam shaft for rotating the same, and with a differential shaft driven in timed relation with the blank and bed movements, said attachment comprising a cam adapted to be connected with the lead screw for rotation on rotation of said lead screw, a differential, means actuated by rotation of the cam for imparting to one element of the differential a movement at a varying velocity, means for driving another element of the differential from the differential shaft of the lathe, and means operatively connecting said differential with said cam shaft.

9. A relieving attachment for a lathe provided with a rotatable blank support, a reciprocable tool support, a slidable bed on which one of said supports is mounted, a lead screw for effecting movement of the tool support, a shaft on which the lead screw is mounted, means for rotating the blank support, means for reciprocating the tool support and a shaft for driving the same, and with a differential shaft driven in timed relation with the blank and bed movements, said attachment comprising a differential adapted to be connected with the three shafts, and mechanism connecting one of the shafts with the differential and imparting to one element of the differential a movement at a varying velocity.

10. In apparatus for relieving hobs, a rotatable blank support, a tool support, a bed movable in a direction longitudinally of the blank and adapted to carry said tool support, means for moving the bed, means for simultaneously imparting a continuous rotary movement to the blank support, and means for reciprocating said tool support, said last named means being actuated at a varying velocity and in timed relation with the blank and bed movements.

11. In apparatus for relieving hobs, a rotatable blank support, a tool, mechanism for imparting a relative movement between the tool and blank longitudinally of the blank, mechanism for simultaneously rotating the blank support, mechanism for effecting a relieving movement between the tool and blank in timed relation to the blank rotation and the longitudinal movement between tool and blank, and means for actuating one of said mechanisms continuously at a varying velocity.

12. In apparatus for relieving hobs, a rotatable blank support, a tool support, a tool mounted thereon, a bed for carrying one of said supports, mechanism for moving the bed in a direction longitudinally of the blank, mechanism for simultaneously rotating the blank support, mechanism for effecting a relieving movement between the tool and blank in timed relation to the blank rotation and bed movements and means for actuating one of said mechanisms continuously at a varying velocity including a differential operatively connected to said mechanism, one element of which is actuated in timed relation with the other two mechanisms at a uniform velocity and another element of which is actuated continuously at a varying velocity.

13. In apparatus for relieving hobs, a rotatable blank support, a tool support, a bed for carrying one of said supports movable in a direction longitudinal of the work, means including a differential, one element of which is driven at a uniform velocity and another element of which is driven at a variable velocity for actuating one of said parts at a variable velocity, means for actuating the other parts, and means including a differential for maintaining a timed relation between all of said parts during their movement.

14. In apparatus for relieving hobs, a rotatable blank support, a reciprocable tool support, a bed movable in a direction longitudinal of the work and adapted to carry one of said supports, means for actuating one of said parts at a variable velocity including a differential one element of which is actuated at a uniform velocity and another element of which is driven by a cam at a variable velocity, means for actuating the other two parts at a uniform velocity and means including a differential for maintaining a timed relation between all of said parts during their movement.

15. In apparatus for relieving hobs, a rotatable blank support, a tool support, a tool mounted thereon, a bed movable in a direction longitudinally of the blank and adapted to carry one of said supports, means for moving said bed, means for simultaneously imparting a continuous rotary motion to the blank support, and means for simultaneously and in timed relation with the bed and blank movements imparting a relieving movement to the tool at a uniform velocity, and means for actuating said last named means at a varying velocity.

ALLAN H. CANDEE.